United States Patent
Terasaki et al.

(10) Patent No.: US 8,020,188 B2
(45) Date of Patent: Sep. 13, 2011

(54) FRAME SPECIFYING METHOD

(75) Inventors: Takashi Terasaki, Kawasaki (JP); Hiroyuki Komai, Kawasaki (JP); Masashi Urushihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 461 days.

(21) Appl. No.: 12/169,097

(22) Filed: Jul. 8, 2008

(65) Prior Publication Data

US 2009/0040383 A1 Feb. 12, 2009

(30) Foreign Application Priority Data

Aug. 10, 2007 (JP) ................................. 2007-209945

(51) Int. Cl.
*H04N 7/173* (2011.01)
(52) U.S. Cl. .............................. 725/113; 725/78; 725/90
(58) Field of Classification Search .................... 725/78, 725/90, 113
See application file for complete search history.

(56) References Cited

U.S. PATENT DOCUMENTS

| | | | |
|---|---|---|---|
| 6,608,930 | B1 | 8/2003 | Agnihotri et al. |
| 6,731,788 | B1 | 5/2004 | Agnihotri et al. |
| 7,536,705 | B1 * | 5/2009 | Boucher et al. .............. 725/112 |
| 2001/0020954 | A1 | 9/2001 | Hull et al. |
| 2002/0163532 | A1 | 11/2002 | Thomas et al. |
| 2003/0021342 | A1 | 1/2003 | Nesvadba et al. |
| 2003/0051255 | A1 * | 3/2003 | Bulman et al. ............... 725/135 |
| 2006/0173825 | A1 | 8/2006 | Hess et al. |
| 2007/0245386 | A1 * | 10/2007 | Morley et al. .................. 725/78 |
| 2008/0279481 | A1 | 11/2008 | Ando |

FOREIGN PATENT DOCUMENTS

| | | |
|---|---|---|
| EP | 1 099 189 | 5/2001 |
| EP | 1 710 717 | 10/2006 |
| JP | 2001-298709 | 10/2001 |
| JP | 2002-44575 | 2/2002 |
| JP | 2002-108889 | 4/2002 |
| JP | 2002-290947 | 10/2002 |
| JP | 2004-297618 | 10/2004 |
| JP | 2005-174320 | 6/2005 |
| JP | 2005-215922 | 8/2005 |
| KR | 10-2007-0061096 | 6/2007 |
| KR | 10-2007-0061160 | 6/2007 |
| WO | WO 00/05679 | 2/2000 |
| WO | 00/45291 | 8/2000 |
| WO | 01/53966 | 7/2001 |
| WO | 02/080524 A1 | 10/2002 |

(Continued)

OTHER PUBLICATIONS

Korean Office Action issued Jan. 19, 2010 in corresponding Korean Patent Application 10-2008-0071663.

(Continued)

*Primary Examiner* — Kieu Oanh Bui

(74) *Attorney, Agent, or Firm* — Staas & Halsey LLP

(57) ABSTRACT

To provide a technology of properly specifying a process target frame in a dynamic image in accordance with a user's instruction. A frame specifying device plays a dynamic image, receives, when a user performs an operation of instructing execution of a process about a partial scene in the dynamic image, an instruction signal based on the user's operation, and specifies, as triggered by receiving the instruction signal, a frame under the play or a frame distanced by a predetermined length of time from the frame under the play as the process target frame when receiving the instruction signal in the frames constructing the dynamic image.

20 Claims, 9 Drawing Sheets

FOREIGN PATENT DOCUMENTS

| | | |
|---|---|---|
| WO | 02/093910 A1 | 11/2002 |
| WO | 2004/053732 | 6/2004 |
| WO | 2007/021996 | 2/2007 |

OTHER PUBLICATIONS

*Research of Degree of Reaction to Net-Synchronized TV CM,* Nikkei Bp Corp,. Searched date Jul. 26, 2007 http://www.nikkeibp.co.jp/netmarketing/databox/nmdb/061201_crossmedia/ with a partial English translation (9 pages, including partial translation).

U.S. Appl. No. 12/175,721, filed Jul. 18, 2008, Hiroyuki Komai et al., Fujitsu Limited of Kawasaki, Japan.

Extended European Search Report, mailed Oct. 24, 2008, in European Application No. 08161386.1 (9 pp.).

European Search Report dated Jan. 7, 2011 and issued in corresponding European Patent Application 08160113.0.

Japanese Patent Office Notice of Reason for Rejection mailed Jun. 21, 2011, for corresponding Japanese Patent Application No. 2007-209945.

\* cited by examiner

— 1 —

FRAME SPECIFYING METHOD

This application claims the benefit of Japanese Patent Application No. 2007-209945 filed on Aug. 10, 2007 in the Japanese Patent Office, the disclosure of which is herein incorporated in its entirety by reference.

BACKGROUND OF THE INVENTION

The present invention relates a technology of specifying a frame in a dynamic image (moving picture) in accordance with a user's instruction.

A TV program (dynamic image; moving picture), which is televised, contains a scene in which to display various categories of information (which are also termed advertisement information) such as a CM (Commercial Message) of a commercial product, an advance notice of the program, a location of a shop introduced in a gourmet program in the original version and a cooking recipe introduced in a cooking program in addition to a content of an original story of the program.

In the case of requiring this type of advertisement information, a general practice is that the information is quickly written down on the paper during a period of being displayed on a TV screen or recorded on a video.

It is, however, time-consuming to prepare the paper and write the information down on the paper or to start up the video system and record the information on the video, and, while on the other hand, a period of time when the advertisement information remains displayed is relatively short, resulting in a case where the information is disabled to be written down or recorded.

For this reason, there is a TV system enabling a user to capture a so-called screen memo for temporarily storing a display image in a memory simply by giving an instruction via a remote controller on such an occasion that the advertisement information is displayed.

SUMMARY OF THE INVENTION

When the user gives the instruction to capture the memo, however, a procedure is that the user, after seeing and judging the advertisement information displayed in the TV screen to be necessary, takes the remote controller in the user's hand and gives the instruction to capture the memo, and hence such a problem arises that there is a time-lag till the capturing instruction is transferred to the TV system since the advertisement information has been displayed, and the information desired by the user can not be invariably surely captured.

Such being the case, the present invention provides a technology of properly specifying a process target frame in the dynamic image in accordance with the user's instruction.

The present invention adopts the following configurations in order to solve the problems given above.

Namely, according to the present invention, a frame specifying method executed by a computer, comprises:

a step of playing a dynamic image;

a step of receiving, when a user performs an operation of instructing execution of a process about a partial scene in the dynamic image, an instruction signal based on the user's operation; and a step of specifying, as triggered by receiving the instruction signal, a frame under the play or a frame distanced by a predetermined length of time from the frame under the play as the process target frame when receiving the instruction signal in the frames constructing the dynamic image.

Further, according to the present invention, a frame specifying device comprises:

a playing unit playing a dynamic image;

an instruction receiving unit receiving, when a user performs an operation of instructing execution of a process about a partial scene in the dynamic image, an instruction signal based on the user's operation; and a frame specifying unit specifying, as triggered by receiving the instruction signal, a frame under the play or a frame distanced by a predetermined length of time from the frame under the play as the process target frame when receiving the instruction signal in the frames constructing the dynamic image.

Further, the present invention may also be a program for making the computer execute the frame specifying method. Yet further, the present invention may also be a readable-by-computer recording medium recorded with this program. The computer is made to read and execute the program on this recording medium, thereby enabling the functions thereof to be provided.

Herein, the readable-by-computer recording medium connotes a recording medium capable of storing information such as data and programs electrically, magnetically, optically, mechanically or by chemical action, which can be read from the computer. Among these recording mediums, for example, a flexible disc, a magneto-optic disc, a CD-ROM, a CD-R/W, a DVD, a DAT, an 8 mm tape, a memory card, etc. are given as those demountable from the computer.

Further, a hard disc, a ROM (Read-Only Memory), etc are given as the recording mediums fixed within the computer.

According to the present invention, it is feasible to provide the technology capable of properly specifying a process target frame in a dynamic image in accordance with a user's instruction.

DETAILED DESCRIPTION OF THE INVENTION

A best mode for carrying out the present invention will hereinafter be described with reference to the drawings. A configuration in the following embodiment is an exemplification, and the present invention is not limited to the configuration in the embodiment.

<Outline of the Embodiment>

A scheme in the embodiment is that the dynamic image is played based on data received from a broadcasting station or data read from a storage medium such as a DVD (Digital Versatile Disc), and, if a user indicates a specified scene at which advertisement information in the dynamic image is displayed, scene constructing frames are specified in a way that takes into consideration a time-lag till the indication is transferred to a frame specifying device.

Then, the specified frames can undergo a predetermined process such as extracting characters and outputting a print.

In the following examples exemplify how the frames are specified, the characters (keyword) are extracted and a search process is executed by use of the keyword.

<Configuration of Device>

Figure 1:
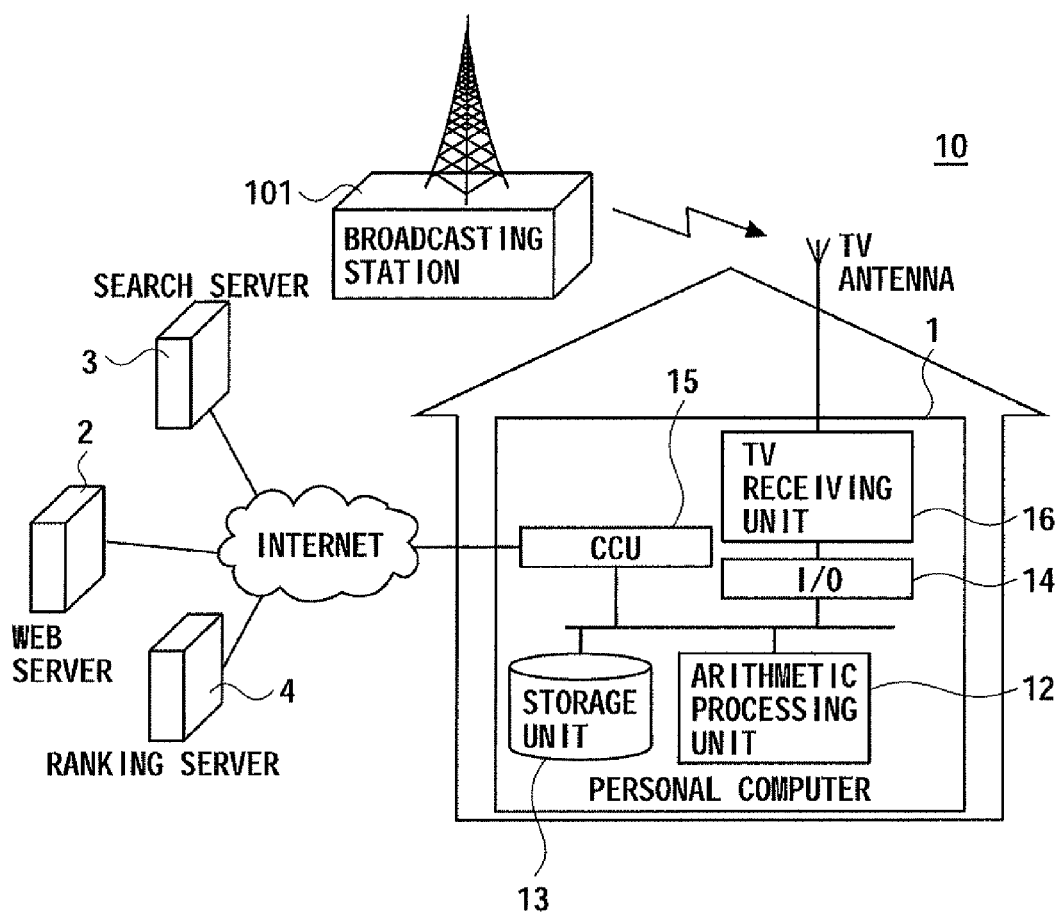
FIG. 1 is a schematic diagram of a search system.

FIG. 1 is a schematic diagram of a search system according to the embodiment.

A search system 10 in the embodiment includes a station-side device 101 of the broadcasting station that telecasts a TV broadcast, a user terminal 1 receiving the dynamic image (moving picture) televised by the station-side device 101, a Web server 2 that provides information via a network such as the Internet, a search server (search engine) 3 that provides a searching service for the information provided by the Web server 2, a ranking server 4, etc.

The user terminal 1 corresponds to the frame specifying device in the search system 10.

The user terminal 1 is a general-purpose computer including an arithmetic processing unit 12 constructed of a CPU (Central Processing Unit), a main memory, etc, a storage unit (hard disk) 13 stored with data and software for an arithmetic process, an input/output port 14, a communication control unit (CCU) 15, etc.

Input devices such as a keyboard, a mouse, a remote controller, a CD-ROM drive and a TV (Television) receiving unit 16, and output devices such as a display device and a printer, are properly connected to the I/O port 14.

The TV receiving unit (tuner) 16 receives radio waves from the broadcasting station via a TV antenna, then converts the radio waves into electric signals (image information), and inputs the signals to the I/O port 14.

The CCU 15 performs communications with other computers via the network.

The storage unit 13 is preinstalled with an operating system (OS) and application software (a frame specifying program, a keyword extraction program, a search program).

The arithmetic processing unit 12 properly reads the OS and the application programs from the storage unit 13 and executes the OS and the application programs, and arithmetically processes pieces of information inputted from the I/O port 14 and the CCU 15 and the information read from the storage unit 13, thereby functioning also as an image acquiring unit (frame specifying unit), an analyzing unit, an extracting unit, a playing unit and an instruction receiving unit.

The image acquiring unit acquires the image information (frames). For example, the image acquiring unit receives the image information received by the TV receiving unit 16 or reads and acquires the image information stored (recorded) in the storage unit 13. Further, the image acquiring unit, when receiving an indication signal given from the instruction receiving unit, specifies the frames constructing the scene indicated by the user from the thus-acquired frames.

The playing unit plays the dynamic image based on the image information acquired by the image acquiring unit. To be specific, the dynamic image is displayed on the display unit, and a sound of the dynamic image is output from a loud speaker. Moreover, the playing unit, for the play, notifies the TV receiving unit 16 of a channel to be received or switched over in accordance with a user's operation etc.

The instruction receiving unit receives a search instruction (instruction signal) given by the user's operation.

The analyzing unit specifies an area corresponding to a predetermined pattern simulating a search box (column) as a simulated search box area.

The extracting unit extracts a search keyword by recognizing characters in the simulated search box area.

The search processing unit executes a search process or a pre-search process by use of the search keyword. The search processing unit transmits a search request containing the search keyword to the search server 3 via the CCU 15, and gets a search result sent back from the search server displayed on the displayed unit. Further, the search processing unit also has a function of accessing the Web server on the basis of a displayed summary of the content and the search result of a hyperlink etc, and displaying the content. Note that the search processing unit may involve using a general type of Web browser.

On the other hand, the search server 3 is a general type of so-called computer-based search engine including a means for receiving the search request from the search processing unit (Web browser) of the user terminal 1, a storage means stored with information of the Web server 2, a means for searching the storage means for a corresponding piece of information of the Web server 2 on the basis of the keyword of the received search request, and a means for transmitting the search result to the requester user terminal 1.

Further, the Web server 2 is connected to other computers such as the user terminal 1 and the search server 3 via the network like the Internet. The Web server 2 provides (transmits) a content (file) designated by the access request (URL etc) given from another computer to the requester computer. Note that the Web server 2 has the well-known configuration, and its in-depth description is omitted.

Similarly, the ranking server (keyword providing server) 4 is connected to other computers such as the user terminal 1 and the search server via the network like the Internet. The ranking server 4, in which the storage unit is stored with ranking information containing the keywords used for the searches on a searching site are sorted in the sequence from the largest in search count down to the lowest, provides the keywords (the ranking information) in response to the requests given from other computers. Note that the ranking server 4 may be used also as the search server 3 in combination. Moreover, an operator may store keywords used for CM in the storage unit. The ranking server 4 has the same configuration as the general type of Web server has, and hence a detailed explanation thereof is omitted.

<Search Method>

Next, a search method (including a search keyword extracting method), which is executed based on a search program by the user terminal 1 having the configuration described above, will be described with reference to FIG. 2.

Figure 2:
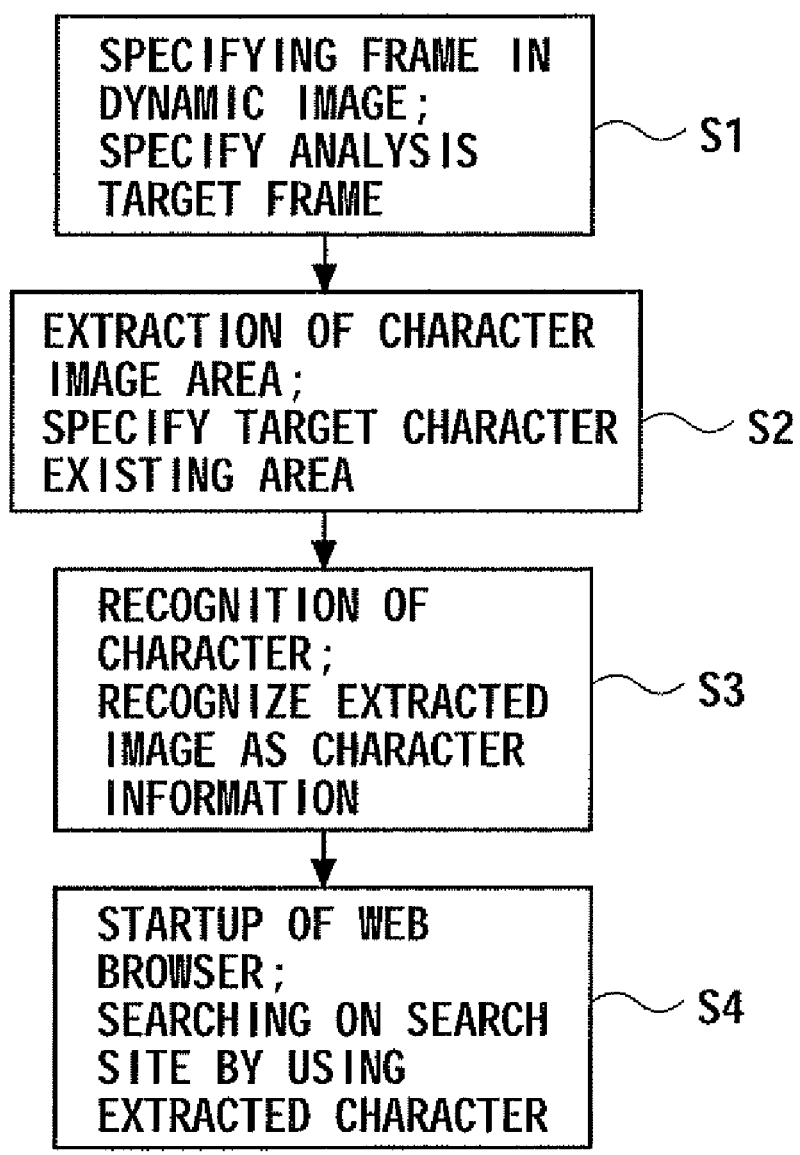
FIG. 2 is an explanatory diagram of a search method (including a search keyword extracting method).

As illustrated in FIG. 2, in the user terminal 1, when instructed to audio/video-receive (play) a TV program through the user's operation, the playing unit plays the dynamic image based on the image information read from the storage unit 13 or received from the TV receiving unit.

At this time, the image acquiring unit of the user terminal 1 specifies (acquires) the frame satisfying a predetermined condition that will be explained later on from within a series of frames constructing the dynamic image as an analysis target frame (image information) (step 1, which will hereinafter be abbreviated such as S1).

Next, the analyzing unit analyzes the specified frame and specifies the simulated search box area corresponding to the predetermined pattern simulating the search box of the search engine (S2).

Moreover, the extracting unit recognizes the characters in the simulated search box area and extracts the keyword (S3).

Then, the search unit starts up the Web browser and transmits the keyword extracted by the extracting unit to the search server, whereby the search is made, and a search result is displayed (S4).

Specific processes in the respective steps will be described by way of the following specific examples.

First Specific Example

Figure 3:
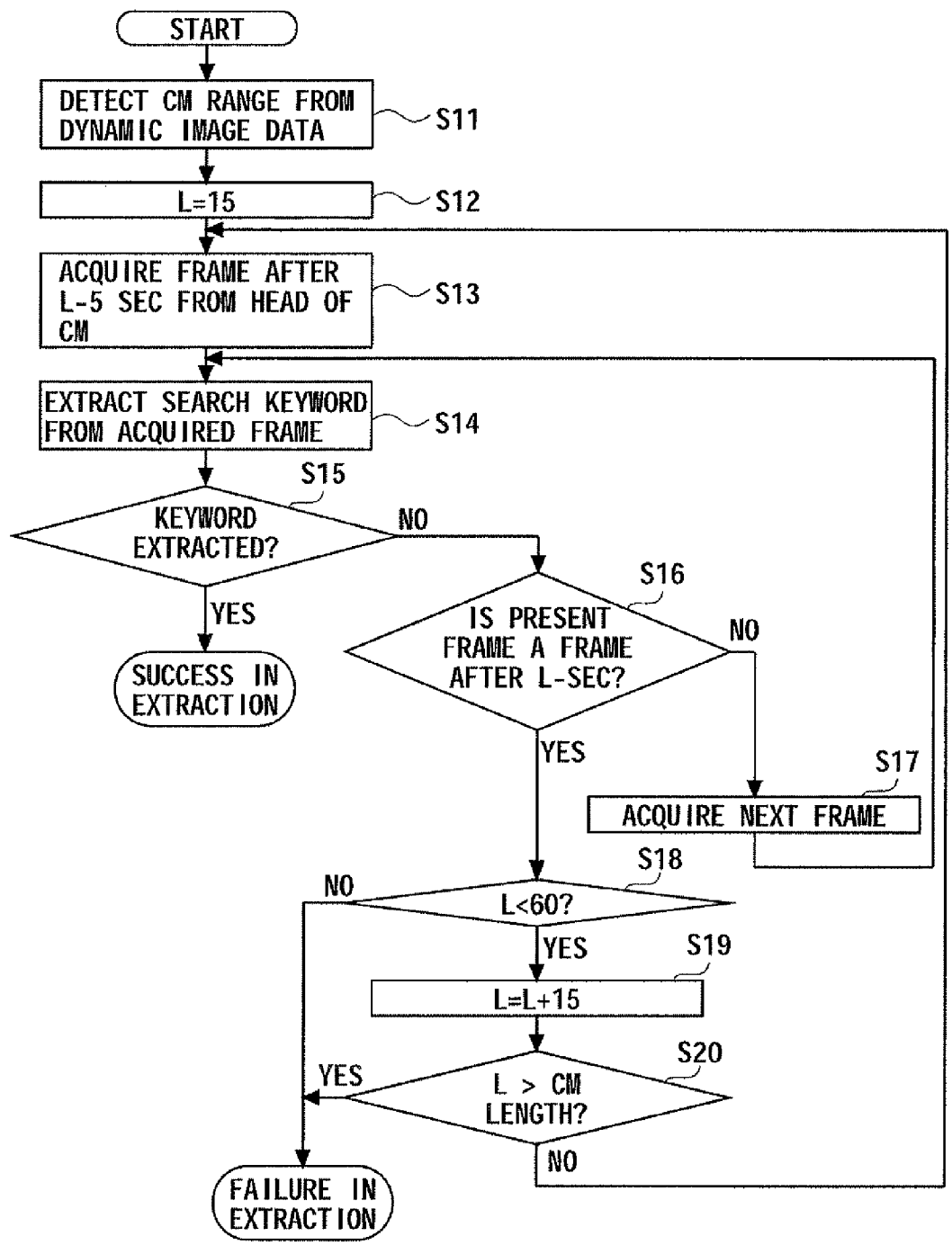
FIG. 3 is an explanatory diagram of a method of searching for a predetermined area (tail) of a CM by automatically specifying this area.

FIG. 3 is an explanatory diagram showing a search method of automatically specifying a predetermined portion (tail) of the CM frame from the dynamic image.

To begin with, the image acquiring unit detects the CM frame other than the original story of the program in the dynamic image (moving picture) (S11).

The CM frame is specified by the present CM detecting method in the case of satisfying the following conditions.

1. An entire area of the frame proves to be different by comparing the anterior and posterior frames (if a degree of coincidence is less than a predetermined value), i.e., there is a predetermined or longer period of mute time when a video clip is changed over.

2. The original story of the program is monophonically broadcast and is switched over to a stereophonic system when televising the CM, and hence the condition is set to a period of time till the broadcasting returns to the monophonic system since the monophonic system has been switched over to the stereophonic system.

3. The video clip is changed over at a predetermined point of time (e.g., a multiple of 15 sec).

4. A predetermined point of time (e.g., 5 min before the hour) is set.

5. Five minutes before and after the program changeover time and a point of time when equally dividing the program (by 2 or 4) from the program changeover time, are set based on program information obtained from an EPG (Electric Program Guide).

Note that The CM detecting method may involve employing any one of other known techniques and may also involve using a combination of those techniques.

Next, the image acquiring unit sets a period of time L serving as a reference for a length of the CM. In the first example, the time L is set such as L=15 (min) (S12).

Incidentally, there is a high possibility that the timing for notifying of the keyword etc exists at the tail of the CM frame, and hence the image acquiring unit acquires the frame ranging to L from after a predetermined time length (L/2, L/3, L-5 (sec)) from the head of the CM frame detected based on the conditions given above. In the first example, the frame acquired ranges from L-5 to L (S13).

Then, the analyzing unit analyzes the frame (image information) acquired by the image acquiring unit and specifies the area corresponding to the predetermined pattern simulating the search box as the simulated search box area, and the extracting unit extracts the characters from the simulated search box area (S14).

Figure 9A:
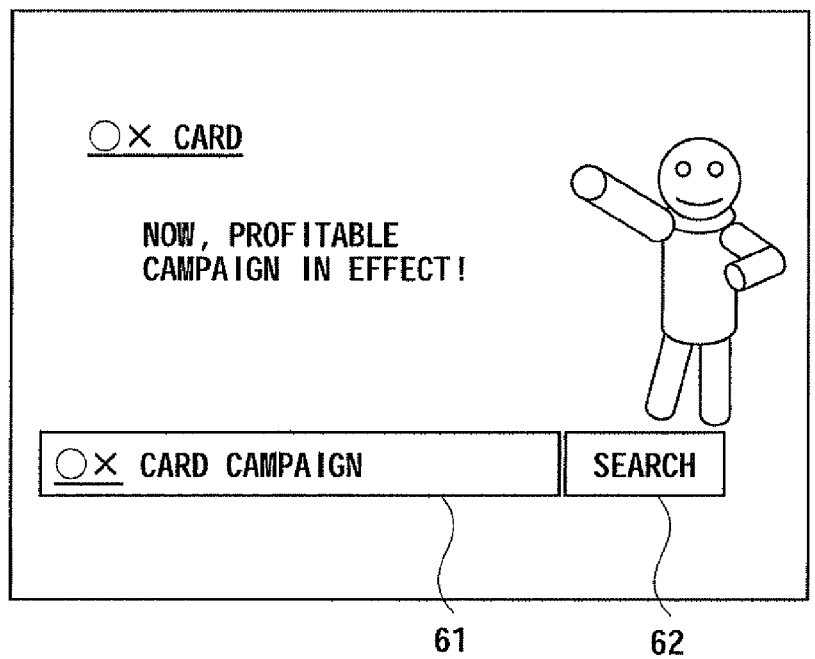
FIG. 9 is an explanatory diagram of an image containing an area simulating a search box.
Figure 9B:
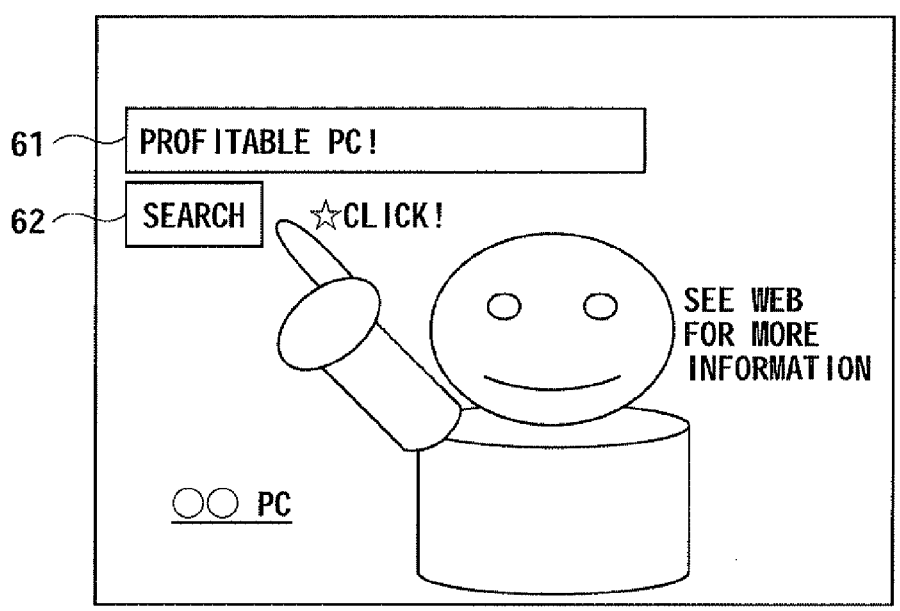

At this time, since the analyzing unit specifies the area simulating the search box in the image as illustrated in FIG. 9, the image is scanned in a horizontal direction (main-scan direction) and a vertical direction (sub-scan direction), and there is extracted an area in which pixels become continuous at a predetermined or longer distance in the horizontal or vertical direction to form a straight line. Then, the area, in which the straight line takes a rectangle, is set as the simulated search box area.

Especially in the present embodiment, a rectangle 62 having a short width (in the horizontal direction) is adjacent to one rectangle 61, and, if a character [Search] exists in the short rectangle, i.e., if coincident with the predetermined pattern such as containing an image corresponding to a search button, the area of the rectangle 61 is specified as the simulated search box area.

At this time, if able to extract the keyword, the search unit is notified of the keyword, and, whereas if unable to extract, the image acquiring unit is notified of a purport of being unable to extract (S15).

The image acquiring unit receiving this extraction-disabled notification judges whether or not this extraction target frame reaches after L-sec from the head of the CM (S16), and, if not the frame reaching after L-sec, acquires the next frame (S17).

Further, if judged to be the frame reaching after L-sec in step 16, it is judged whether or not the time length L is less than 60 sec (S18), then the processing comes to an end if not less than 60 sec, subsequently 15 sec is added to L if equal to or longer than 60 sec (S19), and, if not over a maximum value (e.g., 60 sec) of the CM, the processing loops back to step 13, wherein the frame is acquired (S20).

Note that when acquiring the frame step 13, all the frames ranging from L-5 sec to L-sec may be acquired, however, in the case of the dynamic image (moving picture) based on MPEG (Moving Picture Experts Group) system, only I-pictures (Intra pictures) may also be acquired. Thus, if taking a scheme of acquiring only the I-pictures, a throughput can be reduced.

Second Specific Example

Figure 4:
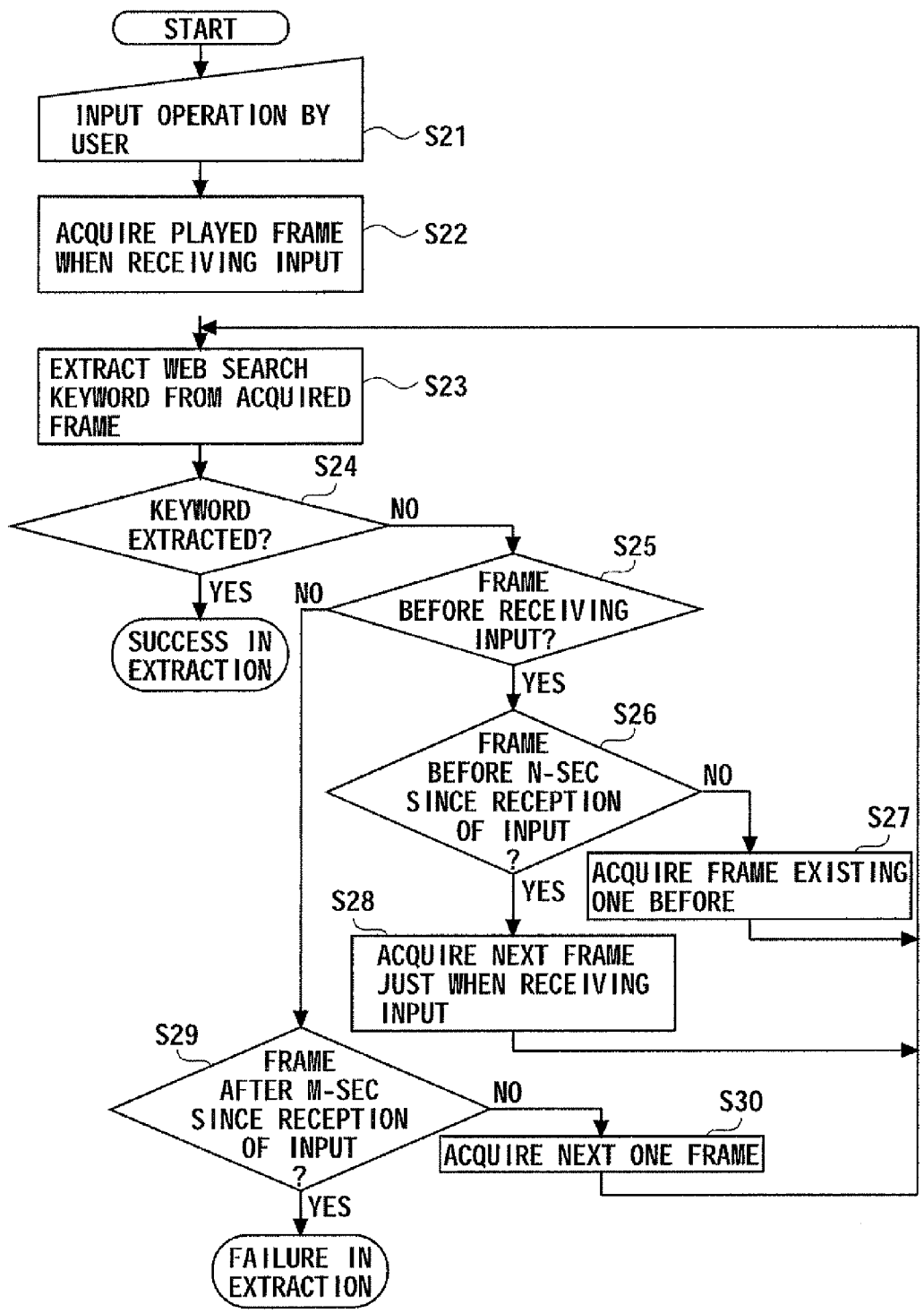
FIG. 4 is an explanatory diagram of a method of extracting a keyword by specifying a frame in accordance with a user's operation.
Figure 5:
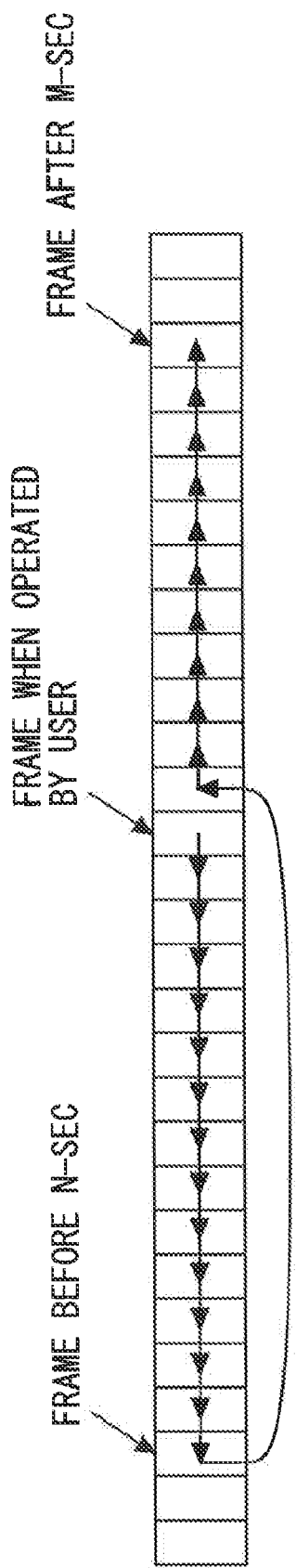
FIG. 5 is an explanatory diagram of an analyzing sequence.

FIG. 4 is an explanatory diagram showing a method of extracting the keyword by specifying the frame in accordance with the user's operation, and FIG. 5 is an explanatory diagram showing an analyzing sequence in the second example.

To start with, when a keyword acquiring instruction is inputted through a user's input operation by use of the keyboard connected via the I/O port 14 and the remote controller (S21), the image acquiring unit acquires the frame that is played at a point of time when receiving the input (S22).

Then, the analyzing unit analyzes the frame (image information) acquired by the image acquiring unit and specifies the area corresponding to the predetermined pattern simulating the search box as the simulated search box area, and the extracting unit extracts the characters from the simulated search box area (S23).

At this time, if able to extract the keyword, the searching unit is notified of the keyword, and, whereas if unable to extract, the image acquiring unit is notified of a purport of being unable to extract (S24).

The image acquiring unit receiving this extraction-disabled notification judges whether or not this extraction target frame is the previous inputted frame (S25) and further judges, if being the previous frame, whether or not the frame is a frame that reaches N-sec earlier from a point of time when receiving the input (S26).

If judged not to be the frame that reaches N-sec earlier in step 26, the frame existing one before is acquired (S27), and, whereas if being the frame that reaches N-sec earlier, the next frame existing at the point of time when receiving the input is acquired (S28).

While on the other hand, if judged to be the frame after receiving the input in step 25, it is judged whether or not the frame is a frame that reaches after M-sec has elapsed since the point of time when receiving the input, and, if not the frame that reaches after the elapse of M-sec, the image acquiring unit is notified of this purport (S29) and acquires next one frame (S30). Note that if judged to be the frame that reaches after the elapse of M-sec in step 29, the extracting process is terminated.

Thus, in the case of specifying the frame in accordance with the user's input, because of there being a high possibility that the user does the input operation after detecting the keyword in the dynamic image, the frame is specified in a way that traces the frames back sequentially from the point of time when receiving the input, and, if the keyword is not extracted, the frame after the point of time when receiving the input is specified as the analysis target frame, thereby enabling the analyzing process to be executed speedily.

Third Example

Figure 6:
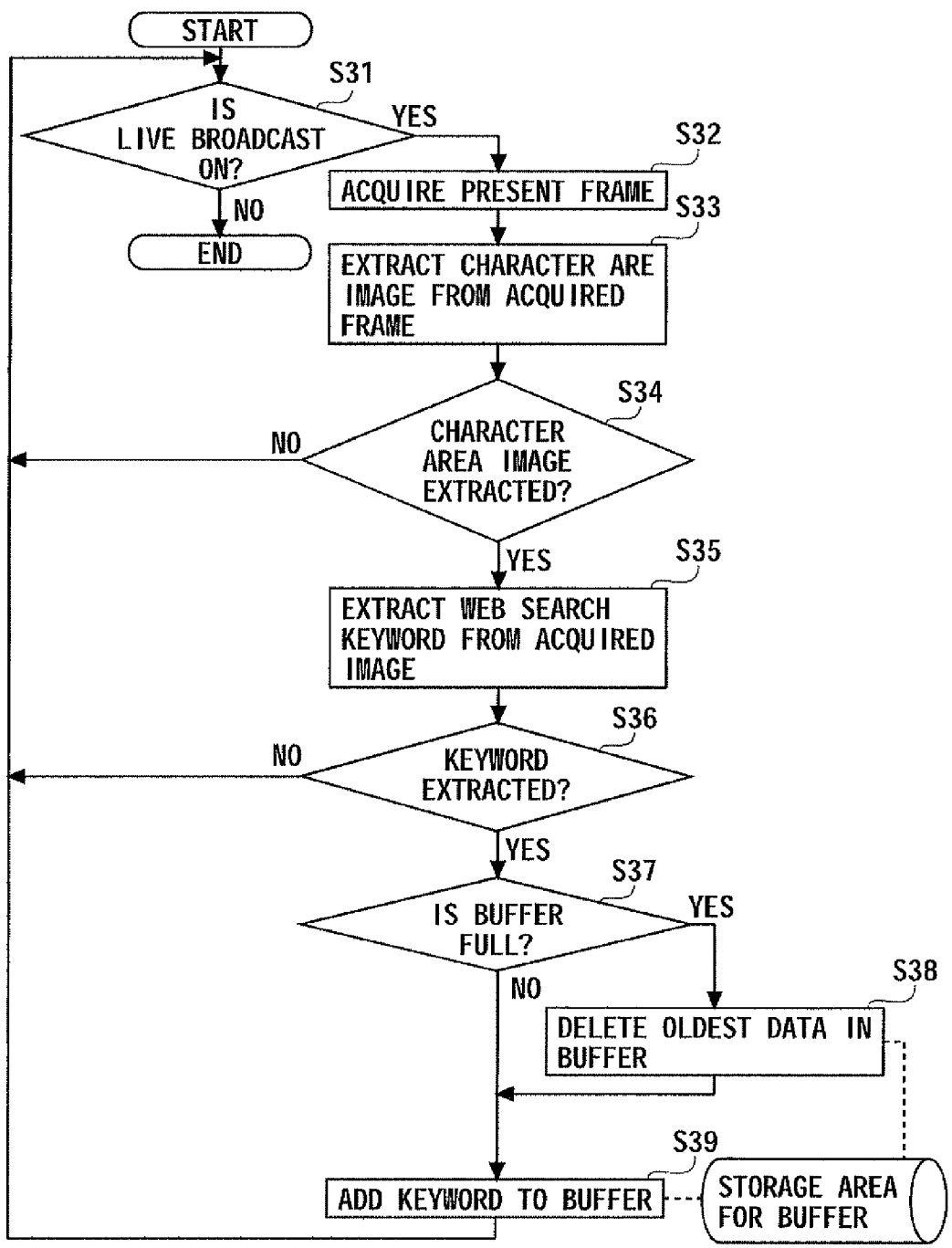
FIG. 6 is an explanatory diagram of an example of buffering the extracted keyword during a live broadcast.

FIG. 6 is an explanatory diagram showing an example of extracting a keyword during a live broadcast and buffering the extracted keyword.

At first, the image acquiring unit determines whether or not the dynamic image under the play is a live broadcast (the information received by the TV receiving unit) (S31), and, if being the live broadcast, the frame at the preset point of time is acquired (S32).

The analyzing unit specifies the simulated search box area from the acquired frame (S33). Herein, if the simulated search box area can be specified, the extracting unit recognizes the characters in the simulated search box area (S34-S35) and extracts the keyword, and, whereas if the simulated search box area can not be specified, the processing loops back to step S31.

If the keyword can be extracted in step 35, it is determined whether the buffer is full of data or not (S36-S37), then the oldest data in the buffer is deleted if full of the data (S38), and the extracted keyword is added to the buffer (S39).

As to the keywords that have been buffered, for example, when an instruction is given from the user, the extracting unit reads the latest keyword from the buffer and notifies the search unit of this keyword, thereby performing the search.

Note that the keyword extracted in step 35 is stored in the buffer in the third example, however, an available scheme is that the simulated search box area specified in step 33 is stored in the buffer, while the steps 34, 35 may be omitted.

Further, in the case of sequentially acquiring the frames during the live broadcast in step 32, all the frames constructing the dynamic image (moving picture) may be acquired, however, another available scheme is that only the I-pictures (Intra pictures) are acquired if being the dynamic image based on the MPEG system. This scheme enables the storage capacity and the throughput of the analysis to be restrained.

Fourth Specific Example

Figure 7:
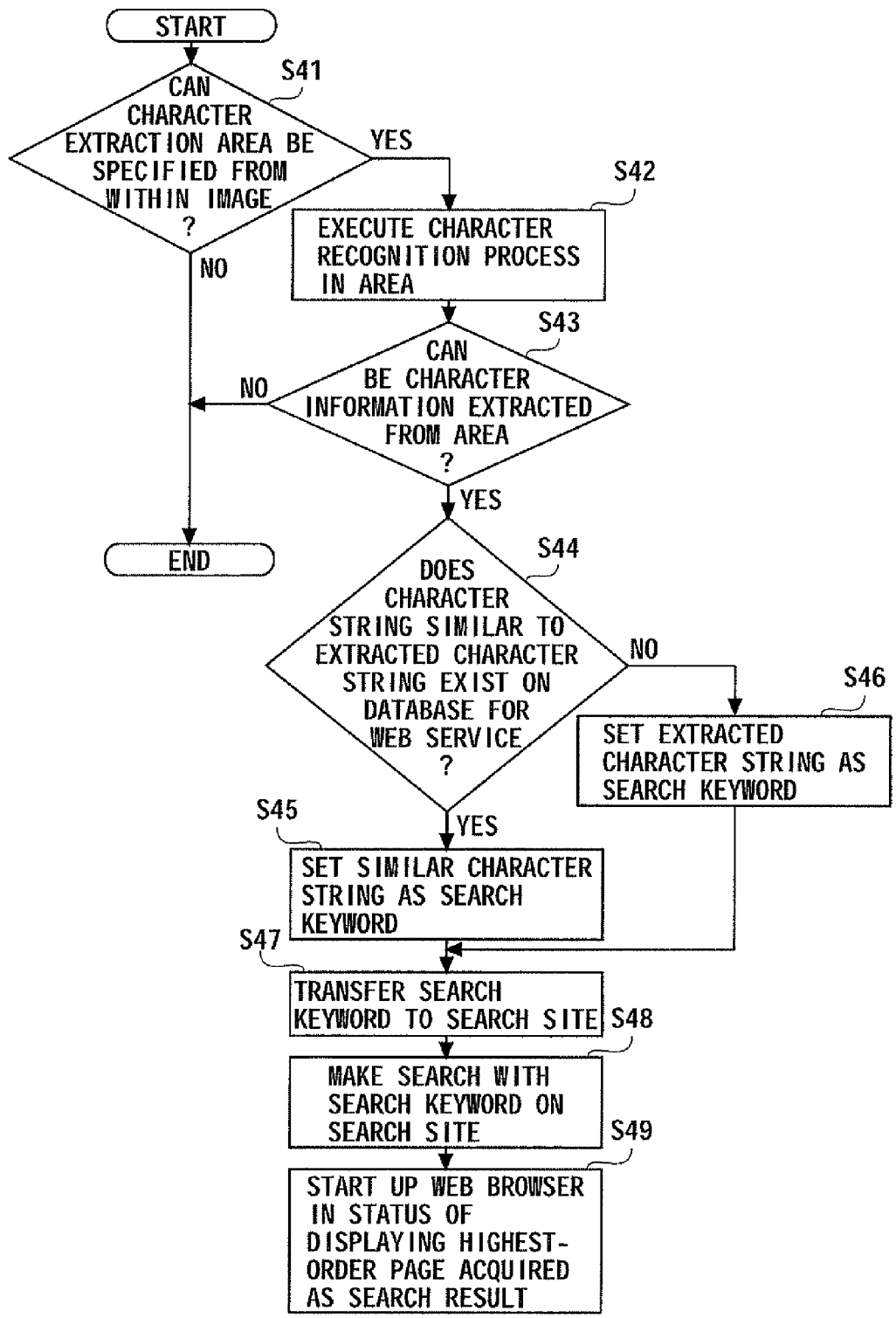
FIG. 7 is an explanatory diagram of a method of making a search by analyzing a post-specifying frame and extracting the keyword.

FIG. 7 is an explanatory diagram showing a method of analyzing the post-specifying frame, extracting the keyword and doing the search.

At the first onset, the analyzing unit analyzes the analyzing target frame, and, if able to specify the simulated search box area (S41), the extracting unit recognizes the characters in this simulated search box area (S42).

If able to extract the keyword from the simulated search box area (S43), the keyword is compared with the keywords stored in a database (storage unit) of the ranking server 4, thus determining whether there is a similar keyword or not (S44).

If there is the similar keyword, the search unit sets this keyword as a search keyword on the Web browser, and accesses the search site, thereby making a search (S45, S47).

Further, if there is no similar keyword in step 44, the extracted keyword is set as the search keyword, thus conducting the search (S46, S47).

When the search site performs the keyword-based search and sends back a search result (S48), the search unit of the user terminal 1 gets a highest-order content of this search result displayed on the display unit (S49).

Figure 8:
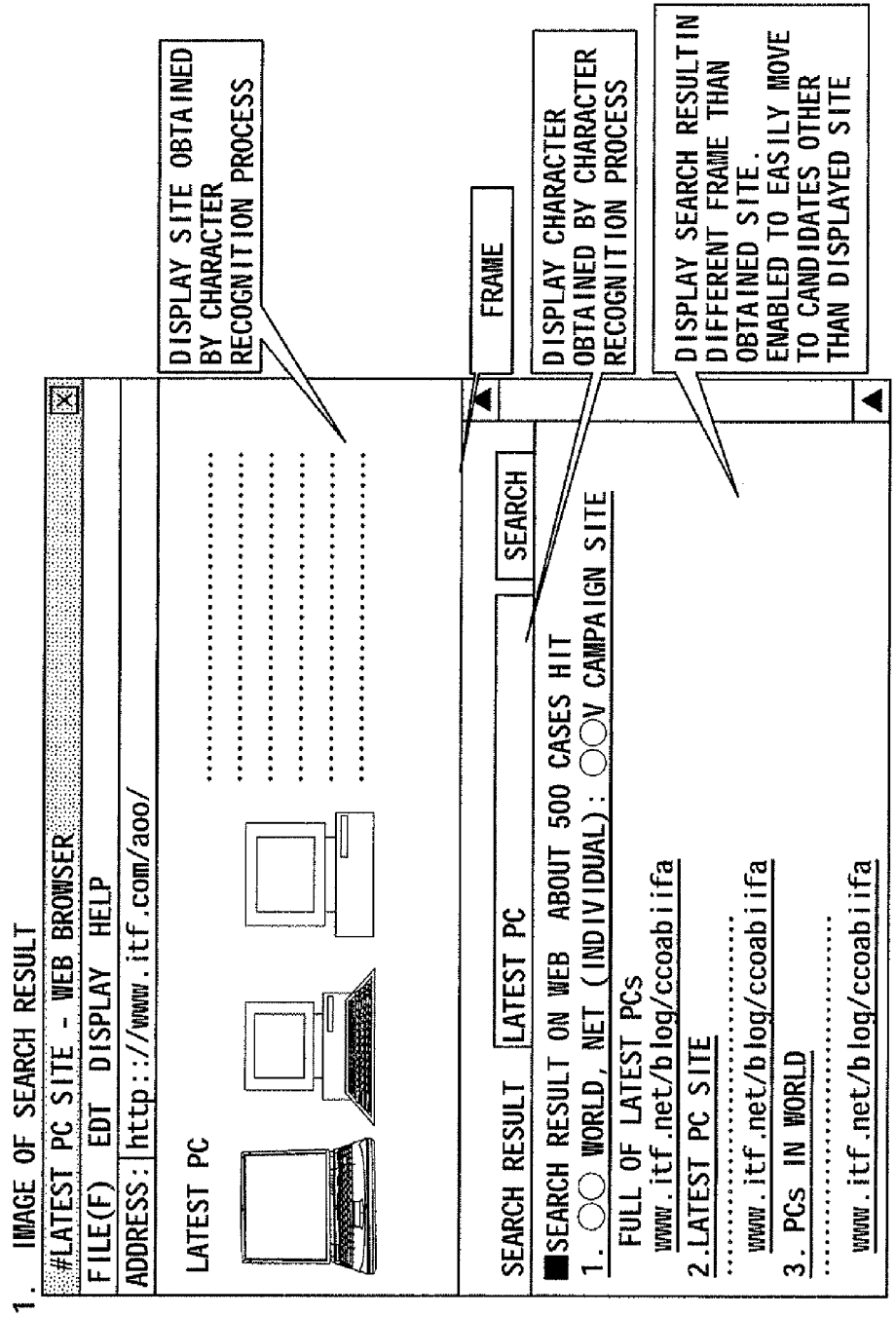
FIG. 8 is a diagram showing an example of displaying a search result.

FIG. 8 is a diagram illustrating an example of displaying the search result.

A URL of the searched content is displayed in an address box 51 in a window showing the search result, and the content received from the Web server is displayed in a content box 52.

Further, in the fourth example, a search result list 54 and a search keyword 53 are also displayed in frames different from the frame of this content. If other links are chosen from the search result list, contents other than the content given above can be also browsed.

It is to be noted that the search result display method is not limited to the method described above, and only the highest-order content or only the search result list may also be displayed.

A further available scheme is that without executing the process up to the keyword-based search, the pres-search process involves stopping the process in a status of starting up the web browser, then inserting the extracted keyword into a search box on a search page of the search server 2, and waiting for the user's operation.

<Others>

The present invention is not limited to only the illustrative examples described above and can be, as a matter of course, modified in many forms within the scope that does not deviate from the gist of the present invention.

What is claimed is:

1. A frame specifying method executed by a computer, comprising:
    playing a dynamic image;
    receiving an instruction signal based on an operation of instructing execution of a process about a partial scene in the dynamic image by a user; and
    specifying, as triggered by receiving the instruction signal, a frame under the play when receiving the instruction signal as a process target frame in the frames constructing the dynamic image, and if a keyword character does not exist in the process target frame, specifying any one of a first frame and a second frame oppositely distanced to each other by a predetermined length of time from the process target frame;
    wherein the predetermined length of time is determined based on a time-lag between the user's operation and receiving the instruction signal.

2. A frame specifying method according to claim 1, wherein the frame anterior to the frame under the play when receiving the instruction signal in the series of frames constructing the dynamic image, is specified as the process target frame.

3. A frame specifying method according to claim 1, wherein the frame disposed at a predetermined interval in the series of frames constructing the dynamic image is specified as the process target frame.

4. A frame specifying method according to claim 1, wherein the frame satisfying a condition for a CM (Commercial Message) is specified as the process target frame from the partial scene by comparing the frames in the dynamic image.

5. A frame specifying method according to claim 4, wherein the frame within a predetermined period in the plurality of frames satisfying the condition for the CM and in a frame group defined as a group of frames that are continuous in time-series, is set as the process target frame.

6. A frame specifying method according to claim 5, wherein the predetermined period corresponds to a second half area in the frame group, or an area after a predetermined length of time from the beginning, or an area before the predetermined length of time from the end.

7. A frame specifying method according to claim 1, wherein the process includes extracting the keyword character from the process target frame.

8. A frame specifying method according to claim 7, wherein the frame before the predetermined length of time from the frame under the play when receiving the instruction signal, is set as the process target frame, and if the keyword character still does not exist, the frame after the predetermined length of time from the frame under the play when receiving the instruction signal, is set as the process target frame.

9. A frame specifying method according to claim 8, wherein the frames are stored in a storage unit, and the frame before the predetermined length of time from the frame under the play when receiving the instruction signal, is read from the storage unit and set as an analysis target frame.

10. A frame specifying device comprising:

a playing unit to play a dynamic image;

an instruction receiving unit to receive an instruction signal based on an operation of instructing execution of a process about a partial scene in the dynamic image by a user; and a frame specifying unit to specify, as triggered by receiving the instruction signal, a frame under the play when receiving the instruction signal as a process target frame in the frames constructing the dynamic image, and if a keyword character does not exist in the process target frame, to specify any one of a first frame and a second frame oppositely distanced to each other by a predetermined length of time from the process target frame;

wherein the predetermined length of time is determined based on a time-lag between the user's operation and receiving the instruction signal.

11. A frame specifying device according to claim 10, wherein the frame specifying unit specifies, as the process target frame, the frame anterior to the frame under the play when receiving the instruction signal in the series of frames constructing the dynamic image.

12. A frame specifying device according to claim 10, wherein the frame specifying unit specifies, as the process target frame, the frame disposed at a predetermined interval in the series of frames constructing the dynamic image.

13. A frame specifying device according to claim 10, wherein the frame specifying unit specifies, as the process target frame, the frame satisfying a condition for a CM (Commercial Message) from the partial scene by comparing the frames in the dynamic image.

14. A frame specifying device according to claim 13, wherein the frame specifying unit specifies, as the process target frame, the frame within a predetermined period in the plurality of frames satisfying the condition for the CM and in a frame group defined as a group of frames that are continuous in time-series.

15. A frame specifying device according to claim 14, wherein the predetermined period corresponds to a second half area in the frame group, or an area after a predetermined length of time from the beginning, or an area before the predetermined length of time from the end.

16. A frame specifying device according to claim 10, further comprising an extracting unit to extract, by way of the process, the keyword character from the process target frame.

17. A frame specifying device according to claim 16, wherein the frame specifying unit sets, as the process target frame, the frame before the predetermined length of time from the frame under the play when receiving the instruction signal, and sets, as the process target frame, if the keyword character still does not exist, the frame after the predetermined length of time from the frame under the play when receiving the instruction signal.

18. A frame specifying device according to claim 17, wherein the frames are stored in a storage unit, and the frame before the predetermined length of time from the frame under the play when receiving the instruction signal, is read from the storage unit and set as an analysis target frame.

19. A frame specifying device according to claim 10, wherein the dynamic image is defined as TV broadcasting signals that are televised.

20. A storage medium readable by a computer, tangible embodying a program of instructions executable by the computer to perform method steps comprising:

playing a dynamic image;

receiving an instruction signal based on an operation of instructing execution of a process about a partial scene in the dynamic image by a user; and specifying, as triggered by receiving the instruction signal, a frame under the play when receiving the instruction signal as a process target frame in the frames constructing the dynamic image, and if a keyword character does not exist in the process target frame, specifying any one of a first frame and a second frame oppositely distanced to each other by a predetermined length of time from the process target frame;

wherein the predetermined length of time is determined based on a time-lag between the user's operation and receiving the instruction signal.

* * * * *